No. 811,421. PATENTED JAN. 30, 1906.
W. C. MAYNARD.
PIN RETAINER.
APPLICATION FILED FEB. 6, 1905.
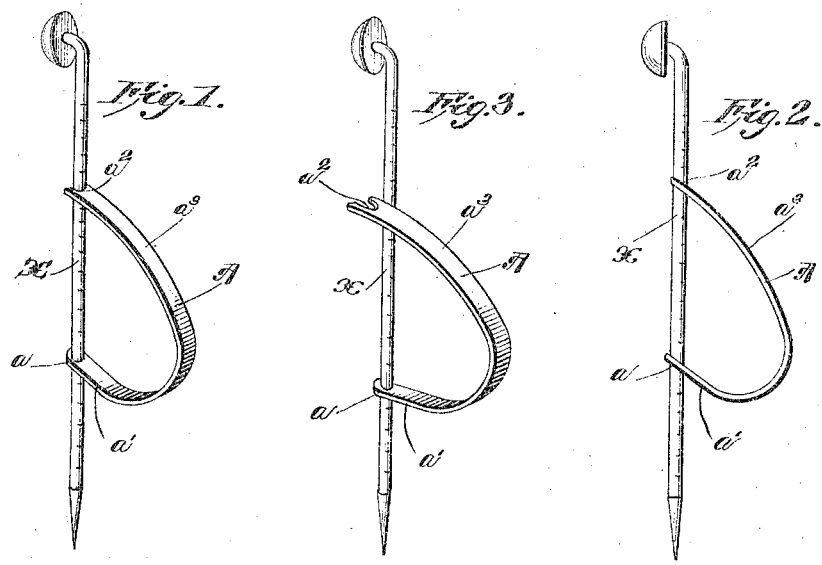
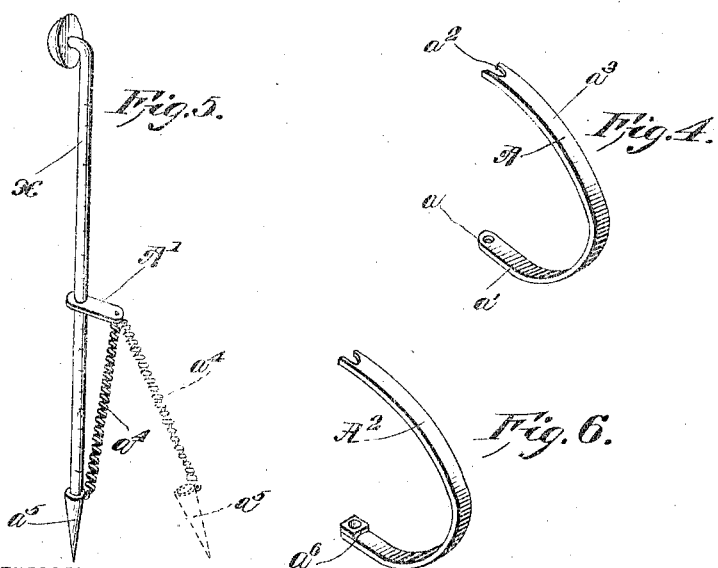
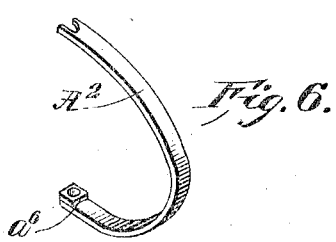
WITNESSES:
E. N. Callaghan.
Amos W. Hart.
INVENTOR
William C. Maynard
BY Munn & Co.
ATTORNEYS

UNITED STATES PATENT OFFICE.

WILLIAM CLIFFORD MAYNARD, OF MIAMI, FLORIDA.

PIN-RETAINER.

No. 811,421. Specification of Letters Patent. Patented Jan. 30, 1906.

Application filed February 6, 1905. Serial No. 244,400.

*To all whom it may concern:*

Be it known that I, WILLIAM CLIFFORD MAYNARD, a citizen of the United States, residing at Miami, in the county of Dade and State of Florida, have made certain new and useful Improvements in Pin-Retainers, of which the following is a specification.

My invention is a device adapted for application to a scarf or hat pin for preventing its accidental or surreptitious detachment.

The details of construction, attachment, and operation of my invention are as hereinafter described, and illustrated in the accompanying drawings, in which—

Figure 1 is a perspective view illustrating the application of my preferred form of the invention to a scarf-pin. Fig. 2 is a side view of the same parts. Fig. 3 is a perspective view of the retainer in the position required for adjusting it on the pin. Fig. 4 is a perspective view of the retainer detached. Fig. 5 is a perspective view illustrating a modification. Fig. 6 is a perspective view of another modification.

As shown in Figs. 1 to 4, inclusive, the retainer is a curved spring A, preferably a plate-spring which is so curved as to have practically the form of a hook. One end $a$ of said spring is provided with an opening which is adapted to receive the body or shank of the pin $x$ somewhat loosely, so that when the adjacent portion $a'$ is inclined or placed at an angle to the pin, as shown in Figs. 1, 2, and 3, it will grip the same by reason of the engagement of opposite edges of the opening with opposite sides of the pin, yet when the part $A'$ is adjusted at right angles, or nearly so, to the pin, as shown in Fig. 3, the retainer will slide freely on the pin, so that it may be adjusted higher or lower on the pin or detached, as occasion may require. The opposite end $a^2$ of the pin is provided with a notch adapted to receive the pin $x$, as indicated in Figs. 1 and 2. Thus when the end $a^2$ is applied to the pin the portion $a'$ having the opening therein is forced downward at an inclination to the pin, and therefore grips the same or takes a firm frictional hold thereon. As will be seen by comparison of Figs. 1 and 2 with Fig. 3, the angle of the part $a'$ to the pin depends to a certain extent upon the tension and leverage applied by the upper portion $a^3$ of the retainer. In other words, when the end $a^2$ is engaged with the pin the entire spring A is put under tension and the part $a'$ is thrown down to its greatest angle to the pin, so that the latter is firmly gripped. It will be seen that this tension becomes greater and the grip firmer when the end $a^3$ of the retainer is pressed downward, which pressure may be applied by the material of the scarf or other part to which the pin is applied, and such pressure would obviously be applied if it were sought to remove the pin. Hence the retainer A will keep its place on the pin under all conditions so long as the end $a^2$ remains engaged therewith, and the notch formed in said end is in any case deep enough to receive the body of the pin and to retain its engagement therewith, owing to the elasticity of the spring A as a whole.

It will be apparent that the efficiency of my device depends largely upon the angle which the part $a'$ is adapted to normally assume with reference to the pin. In other words, if the part $a'$ were horizontal instead of normally inclined to the pin there would be no efficient gripping action. The upward bend of the hook of the retainer is therefore an element that promotes its efficiency.

In order to apply the retainer to a pin or remove it therefrom, the notched end $a^2$ is held disengaged or free from the pin and the end provided with the opening $a$ is slid upon the pin, as will be understood by reference to Fig. 3, and when the retainer has been adjusted to the desired position the notched end $a^2$ is placed in engagement with the pin, whereby the retainer as a whole is put under tension.

In Fig. 5 I illustrate a modification, consisting of a plate A', which is provided with an opening adapted to receive the pin $a$, so that the plate will slide upon and grip the pin in the same manner as the retainer A, before described. To the free end of said plate A', I attach a spring $a^4$, preferably a spiral spring, the lower end of which is connected with a tapered cap $a^5$, adapted to receive the point of a pin. The operation is obvious.

In Fig. 6 I illustrate a spring-plate A², having the end $a^6$, in which the pin-hole is formed, made of double thickness or provided with a reinforce, by which change it is apparent the pin-hole may be made slightly larger than is practicable when the spring is made of uniform thickness throughout, since the edges that engage and bite the pin are separated more widely, and hence the spring may be used on pins varying greatly in thickness, while its elasticity remains practically the same.

Having thus described my invention, what I claim as new, and desire to secure by Letters Patent, is—

1. A pin-retainer comprising a member having an opening that receives the pin loosely, so that said member is adapted to slide upon or grip the pin when placed at different angles, and means integral with said member for applying elastic tension thereto for holding the member normally in the gripping position, substantially as described.

2. A pin-retainer comprising a member having an opening adapted to receive the pin loosely and a spring integral with said member and serving to hold the member normally at an angle to the pin so as to grip it in the manner described.

3. A pin-retainer consisting of a curved spring having at one end an opening adapted to receive a pin loosely, and its opposite end also adapted to engage the pin and press against the same, so as to exert leverage upon the first-named end and thus hold it normally inclined to the pin, substantially as described.

4. A pin-retainer consisting of a spring having a hook form, one end being provided with an opening adapted to receive a pin loosely, and the opposite end adapted to engage the pin, whereby leverage is applied to the end provided with the opening so that the pin is gripped and held by friction, substantially as described.

5. A pin-retainer consisting of a spring which is in curved form, one end thereof having an opening adapted to receive a pin loosely, and the opposite end provided with a notch also adapted to receive the pin, the construction being such that when the notched end of the retainer is engaged with the pin the opposite end is held at an inclination to the pin and thereby caused to grip the same in the manner described.

6. A pin-retainer consisting of a spring having a hook form, the shorter arm or member of such hook having an opening adapted to receive a pin loosely and the opposite end being adapted for engagement with the pin, the construction and arrangement being as described, whereby when the upper end of the spring is applied to the pin, the shorter arm or member is thrown downward and held at an inclination to the pin, the tension and leverage of the spring being thus proportionate to the pressure applied by or to the upper portion of the spring, substantially as described.

7. As an improved article of manufacture, a pin-retainer consisting of a spring having hook form, one end being provided with an opening adapted to receive a pin loosely, and the opposite end provided with a notch for engaging a pin, substantially as described.

8. The improved pin-retainer, consisting of a plate-spring which is in curved form, one end being provided with an opening adapted to receive a pin and the opposite end also adapted to engage the pin, the angle of the part having the opening being such that it is held at an inclination to the pin when the other end is applied thereto, substantially as described.

WILLIAM CLIFFORD MAYNARD.

Witnesses:
J. W. HORNER,
OSCAR W. MAYNARD.